Patented Aug. 20, 1940

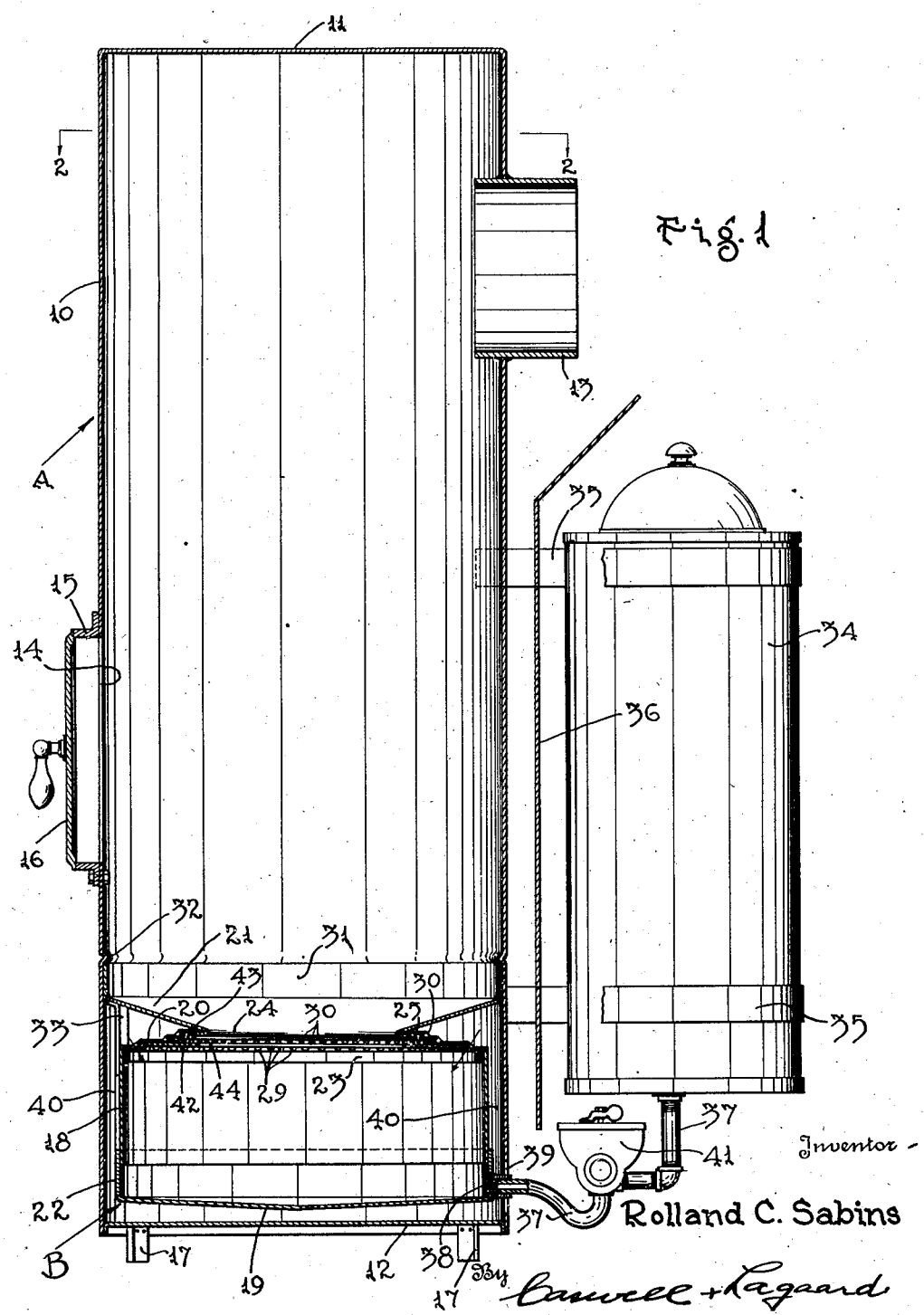

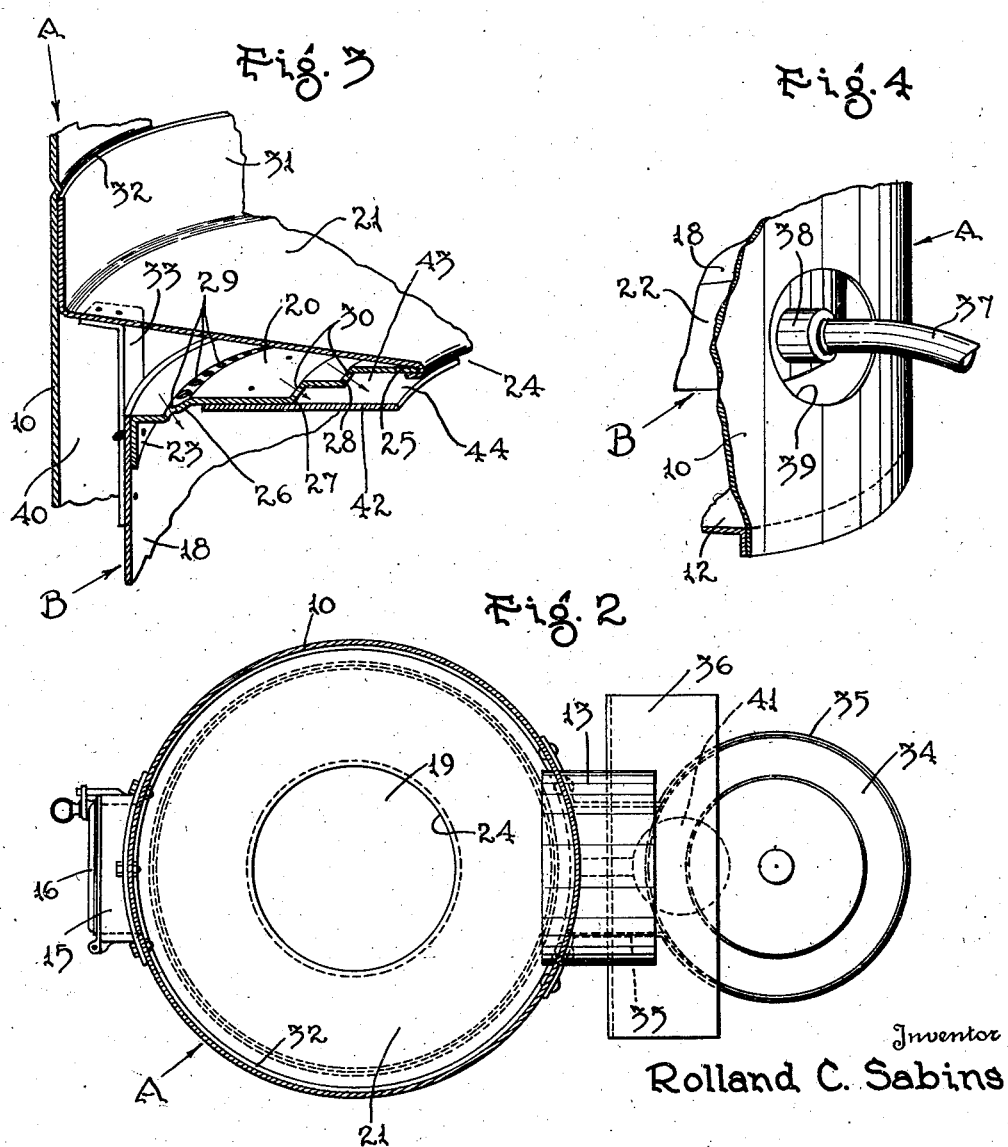

2,212,077

UNITED STATES PATENT OFFICE 2,212,077

LIQUID FUEL HEATING APPARATUS

Rolland C. Sabins, Dupuyer, Mont., assignor of one-half to Charles Albert Akofer, Valier, Mont.

Application June 15, 1938, Serial No. 213,807

3 Claims. (Cl. 158—91)

My invention relates to improvements in liquid fuel heating apparatus and has for an object thereof to provide a highly efficient apparatus of such nature characterized by extreme simplicity and low cost of construction.

Another object of the invention is to supply a pot-type burner in an apparatus of the present character, such burner being so constructed that the base of the heating flame, whether high or low, is disposed substantially at the mouth of the burner, whereby at all settings of the burner full lateral radiation of heat from said flame is acquired.

A further object of the invention is to provide a heating apparatus formed principally from sheet metal and consisting of a heat radiating drum and pot-type burner therein, the construction of the apparatus being such that heat is effectively transferred from the sheet metal parts to the combustion supporting air, whereby the longevity of said parts is promoted and said air is preheated for efficiently supporting combustion in the burner.

Another object of the invention is to provide a heating apparatus of the present nature having a multi-functioning member serving as a partition in the heating drum, and as a hanger for the burner and, also, as a hopper for directing the carbon into the burner which may fall from the inner surface of the drum and, further, as an element for conducting heat from the burner and transferring such heat by radiation to the combustion supporting air at the locality of its entry to the burner.

A further object of the invention is to provide a heater of the present character in which an upward flow of combustion supporting air is induced by stack action between burner and drum and impelled through air inlet openings concentrated at the upper portion of the burner, whereby said air is preheated and its supply to the burner assured under all draft conditions.

An additional object of the invention is to provide apparatus of the present nature in which the secondary air is introduced into the burner in a manner to set up a Venturi action and thereby promote the active and thorough mixing of such combustion supporting air with the fuel vapor at the mouth of the burner.

Another object of the invention is to provide a drum and burner assembly in which that portion of the drum available for heat radiation is relatively great due to comparative shallowness of the burner structure at the base of the drum.

A still further object of the invention is to provide a comparatively shallow burner in which the vaporized fuel is heated in relatively long travel before intermingling with the primary combustion supporting air, whereby the fuel vapor is effectively broken down preparatory to the intermingling thereof with such air.

An additional object of the invention is to provide a domed pot-type burner with primary air inlet openings in the dome having their axes converging upon a central zone of the bottom of the burner, whereby the gases in the burner from bottom to top thereof are subjected to heat from the generating flames through reflection from the dome, and through radiation from the flames themselves.

With the foregoing and other objects in view, which will appear in the following description, the invention resides in the novel combination and arrangements of parts and in the details of construction hereinafter described and claimed.

In the drawings, Fig. 1 is a vertical, central, sectional view of one form of heating apparatus embodying my invention; Fig. 2 is a horizontal sectional view of the form of apparatus shown in Fig. 1, said view being taken as on the line 2—2 of Fig. 1; Fig. 3 is a fragmentary perspective view illustrating, in detail, the construction of the upper portion of the burner, and Fig. 4 is a fragmentary perspective view particularly illustrating the air admission opening in the heating drum and the fuel supply conduit extending through said opening.

Referring to the accompanying drawings, it will be seen that the illustrated embodiment of my invention includes a heating drum indicated in its entirety by the reference character A and a burner likewise indicated in its entirety by the reference character ¬, the burner B being located within the lower porticn of the drum A.

The drum A is principally of sheet metal construction and comprises an upright cylindrical body 10 having a top 11 and a bottom 12. Welded in an opening in the upper portion of the drum body 10 is a flue collar 13. An access opening 14 formed in the drum body 10 is encompassed by a door frame 15 upon which a door 16 is hingedly mounted. Legs 17 support the drum A.

The burner B is constructed of sheet metal and includes a cylindrical body 18, a bottom 19, a dome 20 and a bell 21. The burner bottom 19 is preferably spun or die-formed to provide an upstanding annular flange 22 for attachment, as by welding, to the lower marginal portion of the drum body 18. The dome 20 is all preferably spun or die-formed to provide a depending base flange 23 for attachment, as by welding, to the upper marginal portion of the drum body 18 and to provide a central opening 24 which constitutes the mouth of the burner. Between the depending flange 23 and the lip or inner marginal portion 25 of the dome 20; said dome is of annular step-like construction having one riser 26 near the base thereof and second and third risers 27, 28, respectively, at a higher elevation, riser 26 having a series of primary air apertures or openings 29 therein and risers 27, 28 each having a series of secondary air apertures or openings 30 therein. For the sake of clearness, these secondary air openings 30 in the risers 27, 28 are illustrated in non-staggered relation, but in practice, I prefer to arrange said openings 30 in said risers in staggered realtion to insure a substantially uniform distribution of the secondary air upon its introduction to the burner.

The bell 21 of the burner B is preferably spun or die-formed to provide its frusto-conical body with an upstanding attachment flange 31 at its wide or upper extremity. The outer face of said flange 31 fits against the inner wall of the drum body 10 and the edge of said flange abuts against a locating bead 32 formed in said drum body. The marginal portion of the bell 21, at its narrow or lower extremity, is spun around the lip 25 of the burner dome 20. Stay-straps 33 secured to and depending from the bell 21 are secured at their lower ends to the burner body 18 and rigidly tie said bell and burner body together. This bell 21, among other things, serves as a hanger for the burner B, suspending it within the lower portion of the drum A with the bottom 19 of the burner spaced above the bottom 12 of the drum A and with the body 18 of said burner annularly spaced from the inner wall of said drum body 10.

Fuel oil is fed into the burner from any suitable source of supply at a rate commensurate with the size of the heating flame desired. Shown in the drawings is a fuel supply tank 34 supported by bracket straps 35 riveted to the drum body 10. This tank 34 is shielded by means of a guard 36 from heat radiating from the drum A, said guard being supported by said straps 35. A feed conduit 37 leading from the bottom of the fuel tank 34 connects with a coupling 38 fitted into an opening in the flange 22 of the burner bottom 19. An opening 39 in the drum body 10 receives said fuel conduit 37, said opening being considerably larger than the cross-sectional dimension of said conduit to provide a passageway through the drum body 10 for the ingress of combustion supporting air into the lower portion of the stack-like space 40 between the burner B and said drum body. This admission of air into the drum A about said conduit 37 cools the conduit and the fuel therein in its passage to the burner. A metering valve 41 of suitable construction fitted into the supply conduit 37 regulates the flow of fuel into the burner B to produce therein high, low or intermediate heating flames as may be desired.

The dome 20 of the burner B is supplied with an internal annular flange 42 extending radially inward from said dome, the outer marginal portion of said flange being welded to the inner face of the step in said dome between the lowermost riser 26 and the second riser 27. The opening in this annular flange is slightly greater in diameter than the mouth 24 of the burner B and is axially aligned with said mouth. The inner annular portion of said flange 42 and the upper annular portion of the dome 20 together form a manifold 43 into which combustion supporting air is fed through the secondary air openings 30 in the risers 27, 28 of said dome 20, said manifold having a comparatively narrow annular outlet 44 from which the secondary air issues in direction transversely of the axis of the burner, said outlet 44 being formed between the lip 25 of the dome 20 and the inner marginal portion of the flange 42.

The secondary air inlet openings 30 in the burner dome 20 are formed with their axes so directed that air entering said openings is directed inwardly and downwardly against the upper face of the flange 42 and the primary air inlet openings 29 in said dome 20 are formed with their axes so directed that the air entering said openings is directed inwardly and downwardly toward a central zone of the bottom of the burner.

In addition to its function as a hanger for the burner B, the bell 21 partitions the drum A transversely thereof forming a crown sheet for the stack-like space 40 immediately above the primary and secondary air inlet openings 29, 30 in the dome 20.

The flames from liquid fuel introduced into the burner and lighted initiate the vaporization of the fuel within the burner, after which primary combustion in the form of finger-like generating flames is supported by air entering the primary inlet openings 29. Due to the axial disposition of said primary inlet openings 29, said finger-like generating flames converge inwardly and downwardly within the burner B. In the presence of these generating flames, the fuel vapors within the drum flow outwardly along the bottom 19 of the burner and then ascend in the region of the wall of the burner body 18; the radiated heat from said flames and the heat therefrom reflected by the dome structure serving effectually to break down the fuel vapor. A small proportion of these vapors is consumed in the generating flames, while the remainder thereof flow along the dome structure to the mouth 24 of the burner, where air from the annular opening 44 in the manifold 43 is supplied to support combustion in a main heating flame. As the sheet metal parts of the burner B are heated, the air entering the opening 39 in the drum body 10 is heated somewhat by the bottom 19 of said burner, but more so by the burner body 18, dome 20 and bell 21 in the annular stack-like space 40 between burner and drum. Thus heated, this combustion supporting air is of relatively high temperature when it enters the primary and secondary inlet openings 29, 30 in the burner dome 20. Passing the manifold 43 from the secondary inlet openings 30, the combustion supporting air is further heated by radiation from and contact with the dome 20 and flange 42. Thus, the secondary air issuing from the annular manifold opening 44 is in a highly pre-heated state as it meets the rising gases at the mouth 24 of the burner. The burning of these gases, produces the main heating flame with its base always at the burner mouth, said flame being controlled at high, low and intermediate stages by regulation of the metering valve 41 to increase or diminish the flow of the liquid fuel to the burner B. Effective lateral radiation of heat to the heating drum A from the heating flame, is procured in all stages of said flame whether high or low, such heat as may be intercepted by the burner bell 21 being dissipated by radiation into the air in the space 40 between burner and drum or by conduction to said drum. Said bell 21, in addition to its various functions hereinbefore mentioned, serves further as hopper for directing into the burner any carbon deposits which may fall from the inner wall of the drum body 10.

The annular flange 42 being of sheet metal and relatively thin, the secondary air issuing from the annular opening 44 of the manifold 43 sets up a Venturi action which results in an active and thorough mixing of the fuel vapors with the secondary air at the mouth of the burner. I regard this feature as an important factor in the production of efficient heating flames I have been able to produce in operating embodiments of my invention.

Changes in the specific form of my invention, as herein disclosed, may be made within the scope of what is claimed without departing from the spirit of my invention.

Having described my invention, what I claim as new and desire to protect by Letters Patent is:

1. Apparatus of the character described comprising an upright cylindrical drum and a pot-type liquid fuel burner within the drum, said burner having a cylindrical body, a bottom, a dome formed with a central opening therein providing the mouth of the burner, and a bell issuing from said dome at said mouth thereof, the bell being marginally attached to said drum and serving to partition the same and also serving as a hanger for the burner, the diameter of the burner body being less than that of the drum to provide an annular space between burner and drum beneath said partitioning bell, said dome having a series of primary air inlet openings therein, near the base thereof, directed with their axes converging upon a central annular zone of the bottom of the burner, said dome having a series of secondary air inlet openings therein above said primary air inlet openings, a thin annular flange within the dome mounted at its outer margin on said dome between said primary and secondary air inlet openings, the opening in said annular flange being of slightly greater diameter than the diameter of the burner mouth and axially aligned therewith, said flange and the upper portion of said dome forming a manifold for the air entering said secondary air inlet openings, such manifold having a relatively narrow annular egress opening at the mouth of the burner, and means for introducing liquid fuel into the burner.

2. A pot-type liquid fuel burner having a body, a bottom and a dome formed with a central opening therein providing the mouth of the burner, said burner having a series of primary air inlet openings in the upper portion thereof with the axes of said openings converging downwardly and inwardly and also having a series of secondary air inlet openings in said dome above said air inlet openings, an annular flange internally of the dome having its juncture with said dome beneath said secondary air inlet openings, said flange and said dome forming a manifold for the air entering said secondary air inlet openings, the inner marginal portions of flange and dome forming an annular opening for the inward egress of air from said manifold at the mouth of the burner, and means for introducing liquid fuel into the burner.

3. A pot-type liquid fuel burner having a body, a bottom and a dome formed with a central opening therein providing the mouth of the burner, said burner having therein a series of primary air inlet openings and a series of secondary air inlet openings, the latter being in the dome, above said primary openings, an annular flange internally of the dome, said flange being continuously joined at its outer margin to said dome and having its juncture therewith beneath said secondary air inlet openings, the axes of said secondary openings intercepting said flange, said flange and said dome forming a manifold for the air entering said secondary air inlet openings, the marginal portions of flange and dome adjacent to the respective openings therein forming an annular opening for the inward egress of air from said manifold at the mouth of the burner, and means for introducing liquid fuel into the burner.

ROLLAND C. SABINS.